United States Patent
Oesterle et al.

(10) Patent No.: US 8,302,383 B2
(45) Date of Patent: Nov. 6, 2012

(54) DEVICE FOR INTRODUCING A LIQUID INTO A GAS FLOW

(75) Inventors: Joerg Oesterle, Laichingen (DE); Joachim Braun, Esslingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 630 days.

(21) Appl. No.: 12/573,601

(22) Filed: Oct. 5, 2009

(65) Prior Publication Data

US 2010/0101222 A1   Apr. 29, 2010

(30) Foreign Application Priority Data

Oct. 24, 2008   (DE) .................. 10 2008 053 168

(51) Int. Cl.
*F01N 3/00*   (2006.01)
(52) U.S. Cl. ............ 60/286; 60/295; 60/303; 60/324
(58) Field of Classification Search .............. 60/286, 60/295, 303, 324
See application file for complete search history.

(56) References Cited

U.S. PATENT DOCUMENTS

| | | | |
|---|---|---|---|
| 6,401,449 B1 * | 6/2002 | Hofmann et al. ............ | 60/274 |
| 6,444,177 B1 | 9/2002 | Müller et al. | |
| 6,449,947 B1 * | 9/2002 | Liu et al. ............ | 60/286 |
| 6,516,610 B2 * | 2/2003 | Hodgson ............ | 60/286 |
| 6,620,391 B2 * | 9/2003 | Muller et al. ............ | 423/210 |
| 7,448,206 B2 * | 11/2008 | Meingast et al. ............ | 60/286 |
| 7,581,387 B2 * | 9/2009 | Bui et al. ............ | 60/286 |
| 7,788,907 B2 * | 9/2010 | Koehler et al. ............ | 60/286 |
| 7,814,745 B2 * | 10/2010 | Levin et al. ............ | 60/286 |
| 8,082,732 B2 * | 12/2011 | Nefischer ............ | 60/300 |

FOREIGN PATENT DOCUMENTS

| | | |
|---|---|---|
| DE | 10 2004 004 738 A1 | 8/2005 |
| DE | 10 2006 043 225 A1 | 3/2008 |

* cited by examiner

*Primary Examiner* — Binh Q Tran
*Assistant Examiner* — Diem Tran
(74) *Attorney, Agent, or Firm* — Reinhart Boerner Van Deuren P.C.

(57) ABSTRACT

The present invention relates to a device for introducing a liquid into a gas flow, more preferably for an exhaust system of an internal combustion engine. The device includes a chamber, an injection device and a channel. The channel with a circumferential region of an inlet section protrudes into the chamber and there on an inner side facing the gas flow has a surface. Said surface is arranged offset to the inside with respect to a channel profile. The proposed design results in improved evaporation of the liquid introduced into the gas flow.

12 Claims, 3 Drawing Sheets

DEVICE FOR INTRODUCING A LIQUID INTO A GAS FLOW

CROSS-REFERENCE TO RELATED PATENT APPLICATIONS

This patent application claims the benefit of co-pending German Patent Application No. DE 102008053168.5, filed Oct. 24, 2008, the entire teachings and disclosure of which are incorporated herein by reference thereto.

FIELD OF THE INVENTION

The present invention relates to a device for introducing a liquid into a gas flow, more preferably for an exhaust system of an internal combustion engine

BACKGROUND OF THE INVENTION

With exhaust systems, it is known to introduce different liquid educts into the gas flow in order to trigger different reactions. For example, liquid fuel can be injected upstream of an oxidation catalytic converter in order to bring about heating-up of the exhaust gas flow through a subsequent, exothermal reaction in the catalytic converter and thereby indirectly heating-up of downstream exhaust gas treatment devices. For example, a particle filter for its regeneration can be heated up to a self-igniting temperature in this manner in order to burn off a soot charge. Likewise, a NOX storage catalytic converter can be brought up to its operating temperature through such a measure. Furthermore, it is possible, in principle, to introduce ammonia or urea or a watery urea solution in liquid form into the exhaust gas flow in order to convert nitric oxides in a downstream SCR catalytic converter.

With all these applications, it is of increased importance that the liquid educt injected in the exhaust gas evaporates as completely as possible before it reaches the respective exhaust gas treatment device in which it is required. For example, mixing devices, swirling devices and special evaporation devices as well as any combinations of such devices can be used for this purpose, which bring about extensive evaporation of the liquid and homogenization of the gas-vapor mixture. Devices of this type can however be accompanied with a comparatively high flow resistance which can have a disadvantageous effect on the efficiency of the internal combustion engine.

In addition, devices of this type can also be employed with other technologies. For example with a burner, a liquid fuel can be introduced into an air flow in order to create a corresponding combustion reaction in a combustion chamber of the burner. Burners of this type can be used for example with a fuel cell system or with gas turbine plants.

BRIEF SUMMARY OF THE INVENTION

The present invention deals with the problem of stating an improved or at least another embodiment for a device of the type mentioned at the outset which is more preferably characterized by an improved evaporation effect with least back-pressure possible.

Embodiments of the invention are based on the general idea of diverting the gas flow, into which the liquid is to be introduced, on a surface at a transition from a chamber into a channel which surface with respect to a channel profile located outside this surface is arranged offset towards the inside. The surface subject to the onflow is thus arranged offset upstream within the chamber with respect to the oncoming gas flow. At the same time, the liquid is injected into the chamber opposite the channel. The deflection of the gas flow at the transition into the channel can result in that the injected liquid is forced towards the previously mentioned offset surface of the channel. In the process, liquid can be precipitated on said surface. The mentioned surface region, on which the injected liquid is preferably precipitated, is arranged offset to the inside opposite a channel profile which the channel has in a channel section which adjoins an inlet section comprising the mentioned surface. As a result, this surface and thus the liquid collecting thereon is located in a region of the channel in which said channel has a higher temperature or in which the exhaust gas flow which flows through the channel has a higher temperature. Accordingly, evaporation of the liquid precipitated on the surface is favored through the chosen positioning of the surface. This in turn results in that altogether an improved evaporation effect can be achieved. At the same time, the surface arranged in the region of the flow deflection can be deliberately shaped so that it generates only a comparatively minor flow resistance so that altogether the pressure increase upon the flow through the channel is comparatively minor.

To realize a low-resistance flow deflection in the region of the surface, said surface according to a preferred embodiment can comprise at least one convex contour facing the main flow direction. Through the provision of a convex contour sharp-edged transmissions are avoided which results in low flow resistances. Here the surface can be configured so that it has only a single convex contour. It is likewise possible to equip the surface with a plurality of convex contours arranged transversely to the main flow direction next to one another. These can then be connected with one another or merge with one another via suitable concave contours. Altogether a type of wave profile can be thus realized for the surface.

With a particularly advantageous embodiment, the at least one convex contour on both channel sides, that is transversely to the main flow direction of the gas flow in the chamber merge with the channel profile with a concave contour each. Through this design, conducting a flow leading to the at least one convex contour directed to the inside in the region of these lateral concave contours can be realized in the channel. As a result, the liquid being precipitated on the surface is concentrated in the direction of the at least one convex contour. The onflow and thus the evaporation effect for the liquid present on the surface is improved as a result.

Further important features and advantages of the invention are obtained from the subclaims, from the drawings and from the corresponding figure description by means of the drawings.

It is to be understood that the features mentioned above and still to be explained in the following cannot only be used in the respective combinations stated but also in other combinations or standing alone, without leaving the scope of the present invention.

BRIEF DESCRIPTION OF THE DRAWINGS

Preferred exemplary embodiments of the invention are shown in the drawings and are explained in more detail in the following description wherein identical reference symbols refer to identical or similar or functionally identical components.

DETAILED DESCRIPTION OF THE INVENTION

Figure 1:
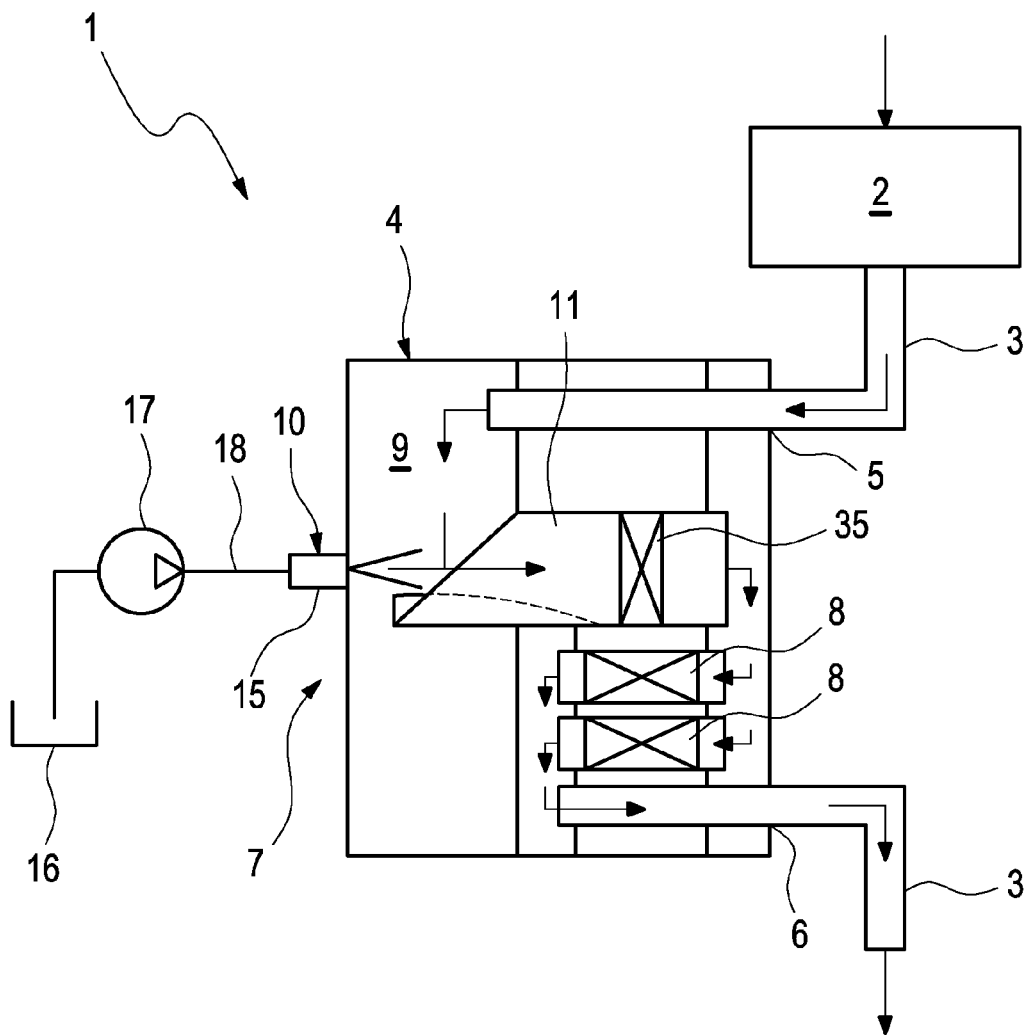
FIG. 1 is a greatly simplified, circuit diagram-like schematic view of an exhaust system for an internal combustion engine.

According to FIG. 1, an exhaust system 1, with the help of which exhaust gas is to be discharged from an internal combustion engine 2, comprises at least 1 exhaust line 3 to which at least one exhaust gas treatment device 4 is connected. In the example, the exhaust line 3 comprises a section leading from the internal combustion engine 2 to an inlet 5 of the exhaust gas treatment device 4 as well as a section leading away from an outlet 6 of the exhaust gas treatment device 4. It is clear that a configuration of this type is to be understood purely exemplarily and without restriction of the generality. The internal combust engine 2, preferably together with the exhaust system 1, can be present in a motor vehicle.

A device 7 with the help of which a liquid can be introduced into a gas flow, here into an exhaust gas flow, is integrated in the exhaust gas treatment device 4. For example, a watery urea solution is introduced into the exhaust gas flow with the help of this device 7. The exhaust gas treatment device 4 additionally comprises at least one SCR catalytic converter 8 which with respect to the exhaust gas flow is arranged within the exhaust gas treatment device 4 downstream of the device 7. Conversion of the urea via ammonia for the reduction of nitric oxides then takes place in this SCR catalytic converter 8, in the example to such SCR catalytic converters 8 are indicated. Alternatively, the device 7 with other applications can for example also be used for introducing a fuel, which for example is to be injected in the exhaust gas system 1 upstream of an oxidation catalytic converter. The mentioned examples however are purely exemplarily so that in principle other solutions are also conceivable. Preferred, at present, is the application for the injection of a watery urea solution upstream of at least one SCR catalytic converter 8 shown here.

According to FIGS. 1 to 4 the device 7 comprises a chamber 9, an injection device 10 as well as a channel 11. In order to define the injection device 10 which generates the actual injection of the liquid with respect to the primary device 7 this overall device 7 can also be designated as device or arrangement for introducing the liquid. In the chamber 9 flows a gas flow in a main flow direction 12 indicated by an arrow when the device 7 or the exhaust system 1 is in operation. With the help of the injection device 10 in operation of the device 7 a liquid with a main injection direction 13 indicated by an arrow can be injected in the chamber 9. This main injection direction 13 for example corresponds to a longitudinal center axis of a cone-shaped injection jet 14 with which the injection device 10 injects the respective liquid in the chamber 9. The injection device 10 comprises an injector 15 or an injection nozzle 15 which at the inlet side is supplied with the liquid from a reservoir 16 via a pump 17. To this end, the pump 17 is arranged in a delivery line 18 which connects the reservoir 16 with the nozzle 15. The arrangement of the injection device 10 on the chamber 9 is so effected that the main injection direction 13 is inclined relative to the main flow direction 12. The channel 11 with respect to the main injection direction 13 of the injection device 10 is connected to the chamber 9 located opposite. In operation of the device 7, the channel 11 discharges a gas flow from the chamber 9 which then flows in the channel 11 in a channel longitudinal direction 19 indicated by an arrow. Here the channel 11 is so arranged on the chamber 9 that the channel longitudinal direction 19 is inclined with respect to the main flow direction 12. This design results in that in a transition region 20 characterized by braces the gas flow flowing in the chamber 19 in the main flow direction 12 is deflected in the channel longitudinal direction 19. In other words, in the mentioned transition region 20 the flow is deflected from chamber 9 into the channel 11. The injection of the liquid by means of the injection device 10 also takes place exactly in this region 20.

Figure 2:
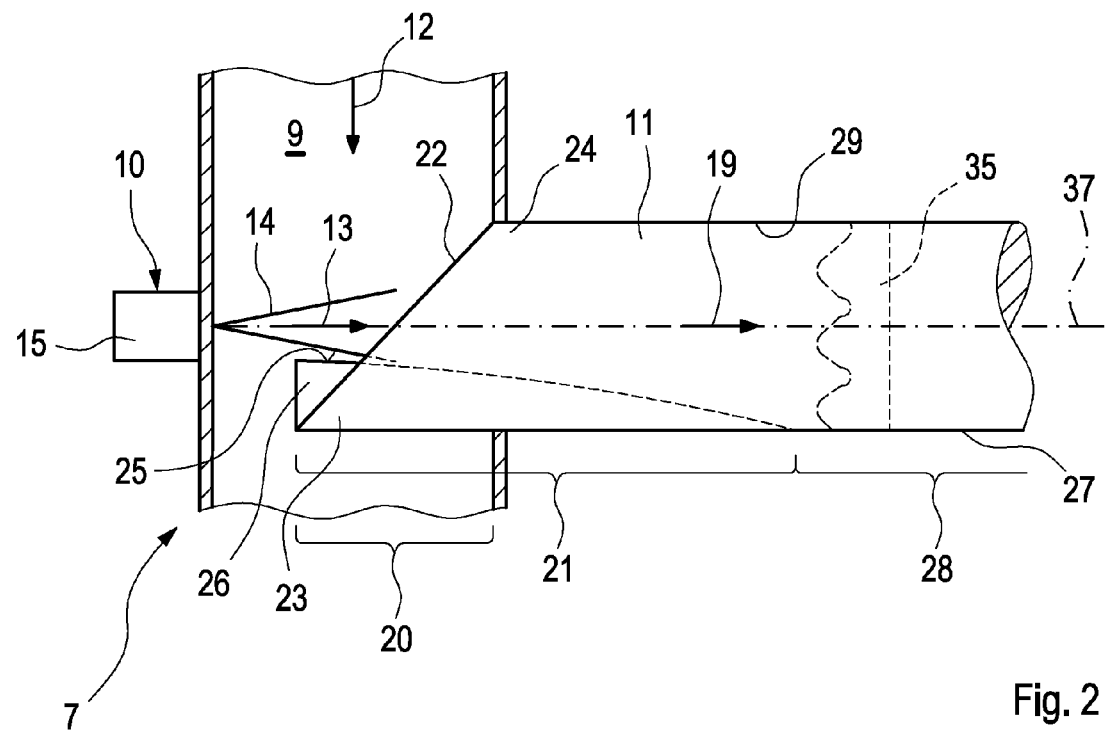
FIG. 2 is a greatly simplified sectional representation of a device for introducing a liquid in a gas flow.

The channel 11 comprises an inlet section 21 which is likewise marked by a brace. This inlet section 21 comprises the transition region 20 and comprises a face end 22 which is beveled with regard to the channel longitudinal direction 19. In the example, the face end 22 is purely exemplarily beveled at about 45° with regard to the channel longitudinal direction 19. This bevel or the beveled face end 22 is spatially so arranged here that a first circumferential region 23 of the inlet section 21 arranged downstream relative to the main flow direction 12 protrudes deeper into the chamber 9 parallel to the channel longitudinal direction 19 than a second circumferential region 24 of the inlet section 21 located opposite, which with regard to the main flow direction 12 is arranged upstream. In this manner, the channel 11 in its inlet section 21 in the first circumferential region 23 is open towards the oncoming gas flow. More preferably, the channel 11 as a result has a surface 25 in the inlet section 21 on an inner side of the first circumferential region 23 facing the main flow direction 12 which is directly impinged by the gas flow and which is more preferably located in the deflection region 20. This surface 25 with the device 7 introduced here is so embodied that it at least comprises one region 26 which with respect to a channel profile 27 is offset to the inside. The channel 11 has said channel profile 27 in a channel section 28 adjoining the inlet section 21 in the channel longitudinal direction 19 which in FIG. 2 is indicated by an open brace. Said region 26 of the surface 25 as a result protrudes as it were into the channel profile 27 in a projection oriented in the channel longitudinal direction 19. Through the proposed design the mentioned surface 25, at least its region 26, is located closer to a longitudinal center axis 37 of the channel 11 than a channel wall 29 which is located outside the inlet section 21 and/or outside the first circumferential region 23. The chosen arrangement results in that precipitation of the injected liquid preferably forms and collects on this "elevated" surface 25. A higher temperature is present in this region and higher flow velocities are also present here. Both parameters support rapid evaporation of the precipitated liquid on the surface 25.

Figure 3:
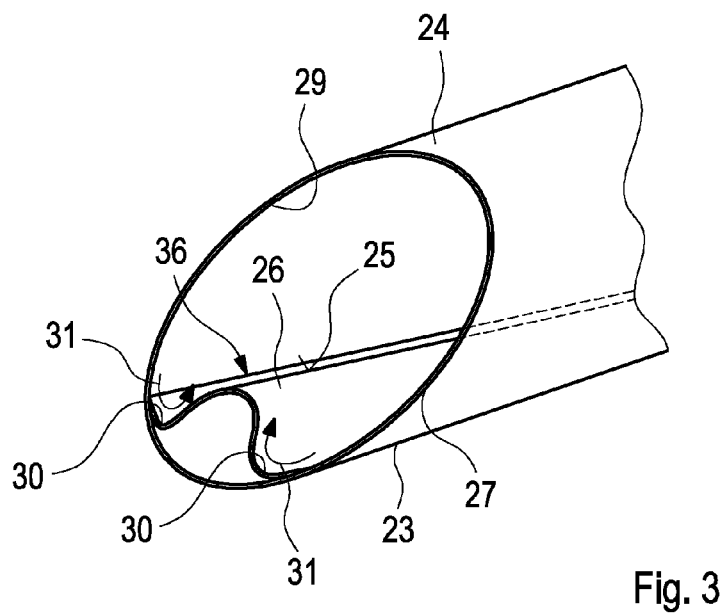
FIG. 3 is a simplified perspective view of an inlet section of a channel of the device from FIG. 2.
Figure 4:
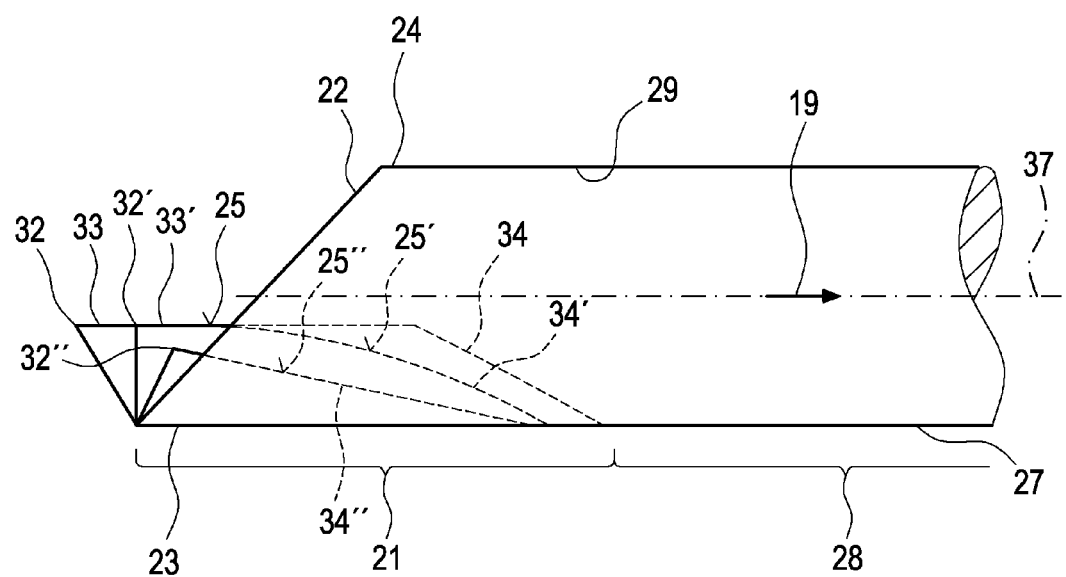
FIG. 4 is a simplified lateral view of the channel with various embodiments.

According to a preferred embodiment, the surface 25 with regard to the symmetry plane which is not shown here can be configured mirror-symmetrically which in the representations of FIGS. 2 and 4 runs parallel to the drawing plane and contains the longitudinal center axis 37. This symmetry plane here extends parallel to the main flow direction 12 and parallel to the channel longitudinal direction 19. The mirror symmetry formed with respect to the symmetry plane is more preferably evident in the view shown in FIG. 3. At the same time, it is evident in FIG. 3 that the surface 25 comprises a contour on the inside of the first circumferential region 23 which with respect to the onflow in the chamber 9 is shaped convexly. In other words, the surface 25 in the at least one offset region 26 is convexly curved towards the second circumferential region 24. In the example, only one such convex zone is shown within the surface 25. It is clear that a plurality of such convex zones are also conceivable. It is also possible that the tangential region of the convex contour, i.e. its apex is widened into a plane. The convex shaping results in a reduction of the flow resistance during the deflection of the gas flow in the transition region 20. It is clear that in principle other geometries and contourings are conceivable which realize a comparatively low deflection resistance and which on the surface 25 provide at least one region 26 which to the channel longitudinal center axis 37 has a reduced distance.

According to FIG. 3, the one convex contour of the surface 25 or the surface region 26 on the two channel sides can merge into the channel profile 27 with a convex contour 30 each. To this end, the channel profile 27 is preferably circular or elliptically as in the example, however at least round. Arrows 31 in FIG. 3 indicate a swirling flow induced by the concave contours 30 which results in that liquid precipitated on the surface 25 concentrates in the central region 26 where it is exposed to more intensive onflow. As a result, evaporation of the liquid can more preferably be supported by this. However, other direction of rotation also possible.

According to FIG. 4, the surface 25 which is formed on the inside of the first circumferential region 23 can start at an inlet edge 32, wherein in FIG. 4 three embodiments are indicated which can be alternatively realized. The reference symbols for the first embodiment are without inverted comma the reference symbols for the second embodiment have an inverted comma while the reference symbols of the third embodiment have two inverted commas. According to the first embodiment, the surface 25 starts at the inlet edge 32 and then initially extends in channel longitudinal direction 19 via a constant or straight-line longitudinal section 33 which extends parallel to the channel longitudinal direction 19. On this straight-line longitudinal section 33 then follows a transition section 34 which in the example shown is designed in a straight line and merges with the channel profile 27. This transition section 34 can also be curved. More preferably, the curvature of the transition section 34 can be configured such that it quasi-tangentially merges with the straight-line section 33 and/or that it quasi-tangentially merges with the channel profile 27. With the second embodiment, the surface 25' again commences at the inlet edge 32', which is again followed by a straight-line longitudinal section 33', but which here is considerably shorter with respect to the channel longitudinal direction 19 than with the first embodiment. This longitudinal section 33' also merges tangentially with the transition section 34', which itself then ends at the channel profile 27. With the third exemplary embodiment, the surface 25" again starts at the inlet edge 32" and then directly merges with the transition section 34", which in this example is configured in a straight line and itself ends at the channel profile 27. It is clear however that in principle other suitable contourings can also be realized for the surface 25. The objective here is also a preferably low pressure increase in the inlet section 21.

With the preferred embodiment shown in FIG. 2, the injection device 10 and the channel 11 are arranged on the chamber 9 and matched to each other in such a manner that the main injection direction 13 runs parallel to the channel longitudinal direction 19. In the shown example the arrangement is even selected so that the injection direction 13 runs coaxially to the channel longitudinal direction 19. Here, the positioning of the surface 29 is such that at least with absent gas flow in the chamber 19 the spray cone 14 is spaced from this surface 25. The gas flow in the chamber 9 then brings about a reduction of this spacing as a result of which more preferably precipitation of the liquid on the surface 25 can occur. In the shown, preferred, example, the injection device 10 is additionally positioned on or matched to the chamber 9 so that the main flow direction 12 runs perpendicularly to the main injection direction 13. Additionally or alternatively, it can be additionally provided to attach the channel 11 to the chamber 9 in such a manner that the main flow direction 12 runs perpendicularly to the channel longitudinal direction 19.

In the example of FIGS. 1 and 2, a mixing device 35 is additionally arranged in the channel 11, that is downstream of the inlet section 21. The mixing device 35 results in homogenization of the vapor-gas mixture via the cross section of the channel 11. More preferably the mixing device 35 can be configured in such a manner that it imparts a swirl to the gas flow in the channel 11.

The surface 25 can be directly established on the channel 11 or on a tubular body forming the channel 11 through suitable plastic deformation of the channel profile 27 performed in the inlet section 21. Alternatively to this, it is likewise possible according to FIG. 3 to form the surface 25 on an insert part 36 which can be established separately to the channel 11 and which is inserted in the inlet section 21 of the channel 11. More preferably, this insert part 36 can be welded or soldered to the channel 11.

What is claimed is:

1. A device for introducing a liquid into a gas flow, for an exhaust system of an internal combustion engine comprising:
a chamber in which in operation of the device, a gas flow flows in a main flow direction;
an injection device arranged on the chamber, which in operation, injects a liquid into the chamber, with a main injection direction which is inclined relative to the main flow direction;
a channel connected to the chamber opposite the injection device which channel in operation discharges the gas flow from the chamber in a channel longitudinal direction which is inclined relative to the main flow direction;
wherein the channel comprises an inlet section which on the face end is beveled relative to the channel longitudinal direction so that a first circumferential region of the inlet section located downstream with regard to the main flow direction in the channel longitudinal direction protrudes deeper into the chamber than a second circumferential region of the inlet section located upstream with respect to the main flow direction; and
wherein the channel in the inlet section on an inner side of the first circumferential region facing the gas flow comprises a surface which comprises at least one region offset to the inside opposite a profile of the channel which the channel has in a channel section adjoining the inlet section.

2. The device according to claim 1, wherein the surface on the inside of the first circumferential region starts at an inlet edge and extends in the channel longitudinal direction via a straight-line longitudinal section or directly merges with a straight-line or curved transition section which merges with the channel profile.

3. The device according to claim 1, wherein the injection device and the channel on the chamber is so arranged that the main injection direction runs parallel to the channel longitudinal direction, wherein the main injection direction can run coaxially to the channel longitudinal direction.

4. The device according to claim 1, wherein at least one of the injection device and the channel is/are so arranged on the chamber that the main flow direction runs at least one of perpendicularly to the main injection direction and perpendicularly to the channel longitudinal direction.

5. The device according to claim 1, wherein in the channel a mixing device is arranged downstream of the inlet section.

6. The device according to claim 1, wherein the surface is directly established on the channel through forming of the channel profile in the inlet section.

7. The device according to claim 1, wherein the surface is embodied on an insert part which is inserted in the channel in the inlet section.

8. The device according to claim 1, wherein the device is integrated in an exhaust gas treatment device of an exhaust system of an internal combustion engine.

9. The device according to claim 1, wherein the surface on the inside of the first circumferential region with regard to a symmetry plane extending parallel to the main flow direction and parallel to the channel longitudinal direction is configured mirror-symmetrically.

10. The device according to claim 9, wherein the surface on the inside of the first circumferential region comprises at least one convex contour facing the gas flow.

11. The device according to claim 10, wherein the at least one convex contour on both channel sides merges with the profile of the channel with a concave contour each.

12. An exhaust system for an internal combustion engine comprising:
an exhaust gas treatment device comprising a device for introducing a liquid into an exhaust gas flow;
at least one exhaust line which is connected to the exhaust gas treatment device;
the device comprising:
a chamber, in which in operation of the device a gas flow flows in a main flow direction;
an injection device arranged on the chamber which in operation injects a liquid into the chamber, with a main injection direction which is inclined relative to the main flow direction;
a channel connected to the chamber opposite the injection device which channel in operation discharges the gas flow from the chamber in a channel longitudinal direction which is inclined relative to the main flow direction;
wherein the channel comprises an inlet section which on the face end is beveled relative to the channel longitudinal direction so that a first circumferential region of the inlet section located downstream with regard to the main flow direction in the channel longitudinal direction protrudes deeper into the chamber than a second circumferential region of the inlet section located upstream with respect to the main flow direction; and
wherein the channel in the inlet section on an inner side of the first circumferential region facing the gas flow comprises a surface which comprises at least one region offset to the inside opposite a profile of the channel which the channel has in a channel section adjoining the inlet section.

* * * * *